US006816832B2

(12) United States Patent
Alanara et al.

(10) Patent No.: US 6,816,832 B2
(45) **Date of Patent: *Nov. 9, 2004**

(54) TRANSMISSION OF COMFORT NOISE PARAMETERS DURING DISCONTINUOUS TRANSMISSION

(75) Inventors: Seppo Alanara, Oulu (FI); Pekka Kapanen, Tampere (FI)

(73) Assignee: Nokia Corporation, Espoo (FI)

( * ) Notice: Subject to any disclaimer, the term of this patent is extended or adjusted under 35 U.S.C. 154(b) by 106 days.

This patent is subject to a terminal disclaimer.

(21) Appl. No.: 09/878,503

(22) Filed: Jun. 11, 2001

(65) Prior Publication Data

US 2001/0046843 A1 Nov. 29, 2001

Related U.S. Application Data

(63) Continuation of application No. 08/936,755, filed on Sep. 25, 1997, now Pat. No. 6,269,331.

(60) Provisional application No. 60/030,797, filed on Nov. 14, 1996.

(51) Int. Cl.[7] .............................. H04B 1/46; H04B 1/04

(52) U.S. Cl. ...................... 704/205; 455/63.1; 455/116; 704/208; 704/214; 704/215

(58) Field of Search ......................... 455/63.1, 79, 222, 455/228, 423, 570, 95, 116; 704/214, 215, 226, 233, 208, 205

(56) References Cited

U.S. PATENT DOCUMENTS 5,170,396 A 12/1992 Rivers et al. .................. 371/6
5,327,439 A 7/1994 Estola et al. .................. 371/43
5,329,550 A 7/1994 Rousseau et al. ........... 455/517
5,396,653 A 3/1995 Kivari et al. ................. 455/88
5,420,889 A 5/1995 Juntti ......................... 375/346
5,430,740 A 7/1995 Kivari et al. .............. 371/37.1
5,511,072 A * 4/1996 Delprat ....................... 370/336
5,570,353 A 10/1996 Keskitalo et al. ............. 370/18
5,577,024 A 11/1996 Malkamaki et al. .......... 370/18
5,606,548 A 2/1997 Vayrynen et al. ........... 370/252
5,689,615 A * 11/1997 Benyassine et al. ........ 704/219
5,737,695 A * 4/1998 Lagerqvist et al. ........... 455/79
5,794,199 A 8/1998 Rao et al. ................... 704/258
5,812,965 A * 9/1998 Massaloux .................. 704/205
5,835,486 A * 11/1998 Davis et al. ................ 370/287
5,835,851 A * 11/1998 Rasmusson et al. .......... 455/79
5,835,889 A 11/1998 Kapanen ..................... 704/215
5,953,666 A 9/1999 Lehtimaki ................... 455/439
5,954,834 A 9/1999 Hassan et al. .............. 704/228
5,960,389 A 9/1999 Jarvinen et al. ............ 704/220

* cited by examiner

*Primary Examiner*—Simon Nguyen
(74) *Attorney, Agent, or Firm*—Harrington & Smith, LLP

(57) ABSTRACT

A comfort noise block, that include a hangover period and comfort noise parameters, is transmitted in such a manner that it is not interrupted by other messages, such as FACCH messages. This is accomplished in a mobile station by a determination of whether any FACCH messages are required to be transmitted. If such FACCH messages exist, a further determination may be made as to which transmission can be made in the shortest time (i.e., the FACCH message or messages or the comfort noise parameters message), and this transmission is made first. In any event the comfort noise parameters block is transmitted without interruption. In a further embodiment of this invention the comfort noise parameters message is transmitted by being concatenated with another message, such as a neighbor channel measurement results message, so as to reduce overhead, conserve bandwidth, and reduce power consumption. An element of the comfort noise parameters message is a Random Excitation Spectral Control (RESC) information element, which is used in the decoder for improving the spectral content of the generated comfort noise so as to better match the background noise at the transmitter.

7 Claims, 13 Drawing Sheets

FIG. 1a
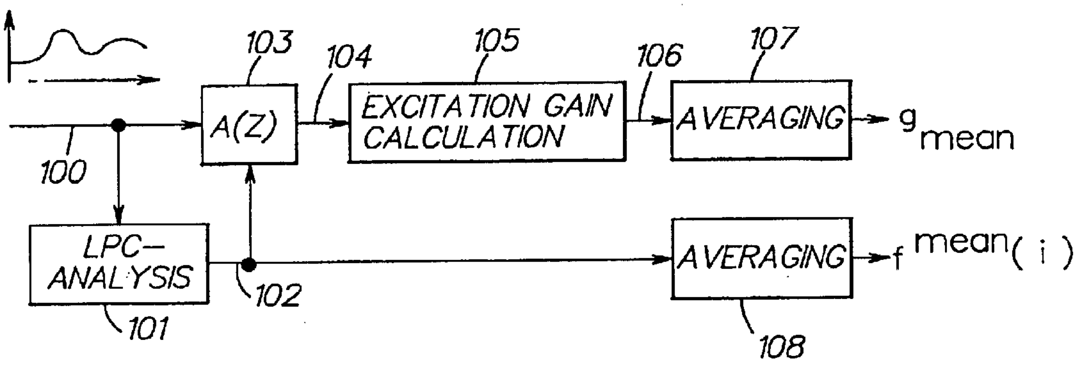
FIG. 1b
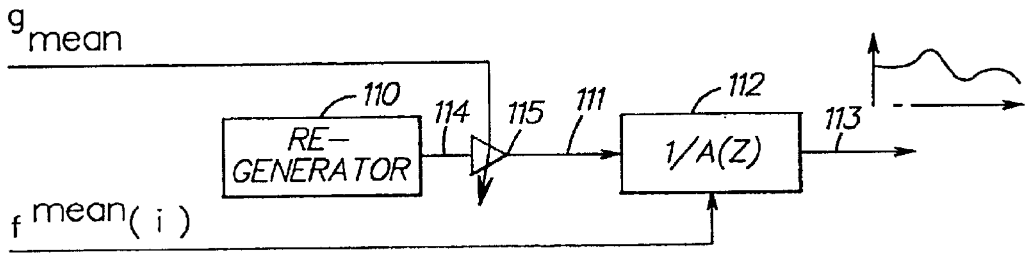
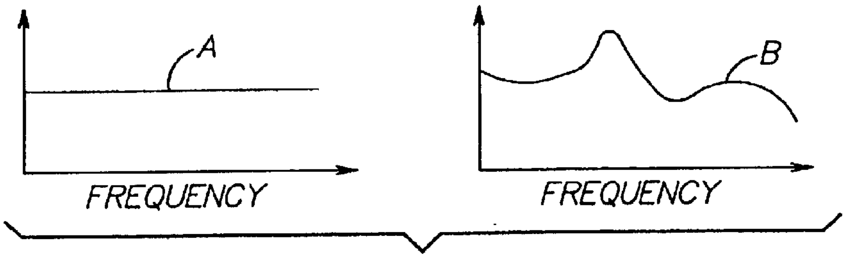
FIG. 1c
FIG. 1d
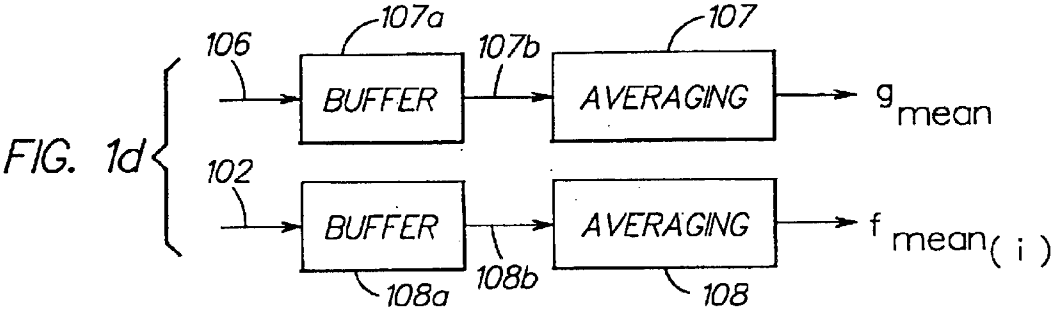

FIG. 2b
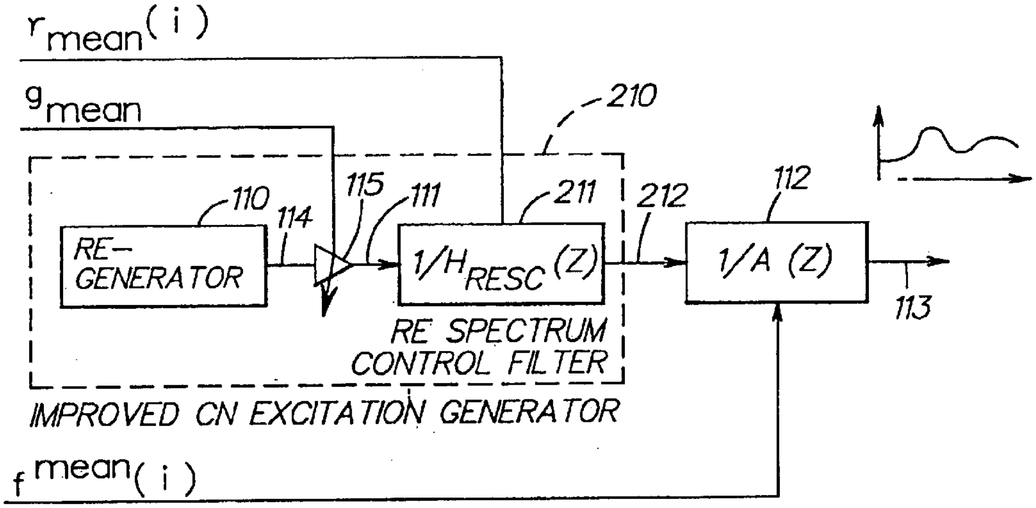
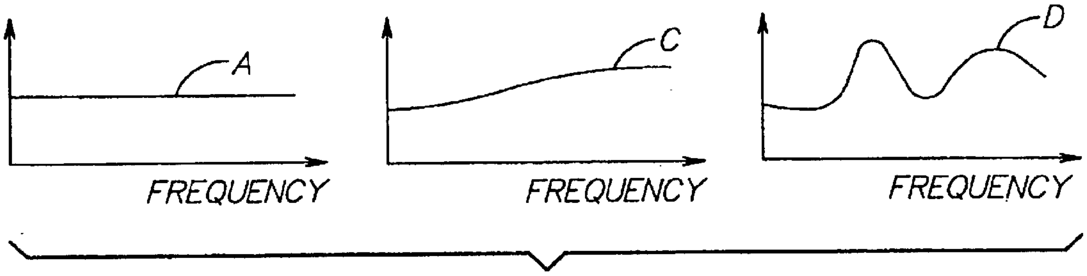
FIG. 2c

TRANSMISSION OF COMFORT NOISE PARAMETERS DURING DISCONTINUOUS TRANSMISSION

CLAIM OF PRIORITY FROM A COPENDING PROVISIONAL PATENT APPLICATION

Priority is herewith claimed under 35 U.S.C. §119(e) from copending Provisional Patent Application 60/030,797, filed Nov. 14, 1996, entitled "Transmission of Comfort Noise Parameters During Discontinuous Transmission", by Seppo Alanärä and Pekka Kapanen. The disclosure of this Provisional Patent Application is incorporated by reference herein in its entirety.

CROSS-REFERENCE TO A RELATED APPLICATION

This patent application is a continuation of allowed U.S. patent application Ser. No. 08/936,755, filed Sep. 25, 1997 now U.S. Pat No. 6,269,331.

FIELD OF THE INVENTION

This invention relates generally to the field of speech communication, and more particularly to discontinuous transmission (DTX) and improving the quality of comfort noise (CN) during discontinuous transmission.

BACKGROUND OF THE INVENTION

Discontinuous transmission is used in mobile communication systems to switch the radio transmitter off during speech pauses. The use of DTX saves power in the mobile station and increases the time required between battery recharging. It also reduces the general interference level and thus improves transmission quality.

However, during speech pauses the background noise which is transmitted with the speech also disappears if the channel is cut off completely. The result is an unnatural sounding audio signal (silence) at the receiving end of the communication.

It is known in the art, instead of completely switching the transmission off during speech pauses, to instead generate parameters that characterize the background noise, and to send these parameters over the air interface at a low rate in Silence Descriptor (SID) frames. These parameters are used at the receive side to regenerate background noise which reflects, as well as possible, the spectral and temporal content of the background noise at the transmit side. These parameters that characterize the background noise are referred to as comfort noise (CN) parameters. The comfort noise parameters typically include a subset of speech coding parameters: in particular synthesis filter coefficients and gain parameters.

It should be noted, however, that in some comfort noise evaluation schemes of some speech codecs, part of the comfort noise parameters are derived from speech coding parameters while other comfort noise parameter(s) are derived from, for example, signals that are available in the speech coder but that are not transmitted over the air interface.

It is assumed in prior-art DTX systems that the excitation can be approximated sufficiently well by spectrally flat noise (i.e., white noise). In prior art DTX systems, the comfort noise is generated in the receiver by feeding locally generated, spectrally flat noise through a speech coder synthesis filter.

Before describing the present invention, it will be instructive to review conventional circuitry and methods for generating comfort noise parameters on the transmit side, and for generating comfort noise on the receive side.

In this regard reference is thus first made to FIGS. 1*a*–1*d*.

Referring to FIG. 1*a*, short term spectral parameters 102 are calculated from a speech signal 100 in a Linear Predictive Coding (LPC) analysis block 101. LPC is a method well known in the prior art. For simplicity, discussed herein is only the case where the synthesis filter has only a short term synthesis filter, it being realized that in most prior art systems, such as in GSM FR, HR and EFR coders, the synthesis filter is constructed as a cascade of a short term synthesis filter and a long term synthesis filter. However, for the purposes of this description a discussion of the long term synthesis filter is not necessary. Furthermore, the long term synthesis filter is typically switched off during comfort noise generation in prior art DTX systems.

The LPC analysis produces a set of short term spectral parameters 102 once for each transmission frame. The frame duration depends on the system. For example, in all GSM channels the frame size is set at 20 milliseconds.

$$A(z) = 1 - \sum_{i=1}^{M} a(i) z^{-i}. \quad (1)$$

The speech signal is fed through an inverse filter 103 to produce a residual signal 104. The inverse filter is of the form:

The filter coefficients a(i), i=1, . . . , M are produced in the LPC analysis and are updated once for each frame. Interpolation as known in prior art speech coding may be applied in the inverse filter 103 to obtain a smooth change in the filter parameters between frames. The inverse filter 103 produces the residual 104 which is the optimal excitation signal, and which generates the exact speech signal 100 when fed through synthesis filter 1/A(z) 112 on the receive side (see FIG. 1*b*). The energy of the excitation sequence is measured and a scaling gain 106 is calculated for each transmission frame in excitation gain calculation block 105.

The excitation gain 106 and short term spectral coefficients 102 are averaged over several transmission frames to obtain a characterization of the average spectral and temporal content of the background noise. The averaging is typically carried out over four frames for the GSM FR channel to eight frames, as is the case for the GSM EFR channel. The parameters to be averaged are buffered for the duration of the averaging period in blocks 107*a* and 108*a* (see FIG. 1*d*). The averaging process is carried out in blocks 107 and 108, and the average parameters that characterize the background noise are thus generated. These are the average excitation gain $g_{mean}$ and the average short term spectral coefficients. In modern speech codecs, there are typically 10 short term spectral coefficients (M=10) which are usually represented as Line Spectral Pair (LSP) coefficients $f_{mean}(i)$, i=1, . . . , M, as in the GSM EFR DTX system. Although these parameters are typically quantized prior to transmission, the quantization is ignored in this description for simplicity, in that the exact type of quantization that is performed is irrelevant to the teachings of this invention.

Referring briefly to FIG. 1*d*, it is shown that the averaging blocks 107 and 108 each typically include the respective buffers 107*a* and 108*a*, which output buffered signals 107*b* and 108*b*, respectively, to the averaging blocks.

The computation and averaging of the comfort noise parameters is explained in detail in GSM recommendation: GSM 06.62 "Comfort noise aspects for Enhanced Full Rate (EFR) speech traffic channels". Also by example, discontinuous transmission is explained in GSM recommendation: GSM 06.81 "Discontinuous Transmission (DTX) for Enhanced Full Rate (EFR) for speech traffic channels", and voice activity detection (VAD) is explained in GSM recommendation: GSM 06.82 "Voice Activity Detection (VAD) for Enhanced Full rate (EFR) speech channels". As such, the details of these various functions are not further discussed here.

Referring to FIG. 1*b*, there is shown a block diagram of a conventional decoder on the receive side that is used to generate comfort noise in the prior art speech communication system. The decoder receives the two comfort noise parameters, the average excitation gain $g_{mean}$ and the set of average short term spectral coefficients $f_{mean}$ (i) i=1, . . . ,M, and based on the parameters the decoder generates the comfort noise. The comfort noise generation operation on the receive side is similar to speech decoding, except that the parameters are used at a significantly lower rate (e.g., once every 480 milliseconds, as in the GSM FR and EFR channels), and no excitation signal is received from the speech encoder. During speech decoding the excitation on the receive side is obtained from a codebook that contains a plurality of possible excitation sequences, and an index for the particular excitation vector in the codebook is transmitted along with the other speech coding parameters. For a detailed description of speech decoding and the use of codebooks reference can be had to, by example, U.S. Pat. No. : 5,327,519, entitled "Pulse Pattern Excited Linear Prediction Voice Coder", by Jari Hagqvist, Kari Järvinen, Kari-Pekka Estola, and Jukka Ranta, the disclosure of which is incorporated by reference herein in its entirety.

During comfort noise generation, however, no index to the codebook is transmitted, and the excitation is obtained instead from a random number or excitation (RE) generator 110. The RE generator 110 generates excitation vectors 114 having a flat spectrum. The excitation vectors 114 are then scaled by the average excitation gain $g_{mean}$ in scaling unit 115 so that their energy corresponds to the average gain of the excitation 104 on the transmit side. A resulting scaled random excitation sequence 111 is then input to the speech synthesis filter 112 to generate the comfort noise 113. The average short term spectral coefficients $f_{mean}$(i) are used in the speech synthesis filter 112.

FIG. 1*c* illustrates the spectrum associated with the signal in different parts of the prior art decoder of FIG. 1*b*. The RE-generator 110 produces the random number excitation sequences 114 (and the scaled excitation 111) having a flat spectrum. This spectrum is shown by curve A. The speech synthesis filter 112 then modifies the excitation to produce a non-flat spectrum as shown in curve B.

During a hangover period, or time between when a voice activity detector (VAD) indicates that speech has stopped and when the transmission is actually terminated, the speech coding parameters characterizing background noise are stored and averaged for constructing CN parameters. Reference in this regard can be had to FIGS. 3 and 4, which are exemplary of the GSM system. Since the VAD has detected speech inactivity, it is guaranteed that the speech frames contain only noise (and not speech), and thus these hangover frames can be used for the averaging of speech encoder parameters to evaluate the comfort noise parameters.

The length of the hangover period is determined by the length of the SID averaging period, i.e., the length of the hangover period must be long enough to complete the averaging of the parameters before the resulting comfort noise parameters are to be transmitted in a SID frame. In the DTX system of the GSM full rate speech coder, the length of the hangover period equals four frames (the length of the SID averaging period), since the comfort noise evaluation technique uses only parameters from the previous frames to make an updated SID frame available. In the DTX system of the GSM enhanced full rate speech coder, the length of the hangover period equals seven frames (the length of the SID averaging period minus one), since the parameters of the eighth frame of the SID averaging period can be obtained from the speech encoder while processing the first SID frame. FIG. 3 illustrates the concepts of the hangover period and the SID averaging periods in the DTX system of the GSM enhanced full rate speech coder, and FIG. 4 shows as an example the longest possible speech burst without hangover.

At the end of the hangover period the first SID frame is transmitted, and the comfort noise evaluation algorithm continues evaluating the characteristics of the background noise and passes the updated SID frames to the transmitter frame by frame, as long as the VAD continues to detect speech inactivity.

It can be appreciated that, if the transmission of comfort noise parameters is not regular in nature, the resulting generated comfort noise may not match the original background noise at the transmitter.

It can be further appreciated that if the comfort noise parameters are transmitted as separate, discrete messages, that a certain amount of system bandwidth is consumed. By example, if in the IS-136 system the CN parameters were sent in a dedicated Fast Associated Control Channel (FACCH) message, then two time slots would be required because of the two burst interleaving that is employed for FACCH messages.

In the IS-136 system the FACCH is defined to be a blank and burst channel used for signalling exchange between the base station and the mobile station. A Slow Associated Control Channel (SACCH) is defined to be a continuous channel used for message exchange between the base station and the mobile station. A fixed number of bits are allocated to the SACCH in each TDMA slot.

In the prior art GSM system the comfort noise parameters are sent in-band (i.e., coded into voice coder slots). While this technique may be applicable to other digital cellular standards, it would not be compatible with a presently specified IS-136 Enhanced Full Rate (EFR) voice coder. It has also been found that the approximately 0.5 second CN update that is performed in GSM may be relaxed, thereby utilizing less system bandwidth for CN updates.

OBJECTS AND ADVANTAGES OF THE INVENTION:

It is thus a first object and advantage of this invention to provide an improved method for transmitting a comfort noise block during DTX operation.

It is a further object and advantage of this invention to transmit a comfort noise block in such a manner that it is not interrupted by other messages, such as FACCH messages.

It is one further object and advantage of this invention to concatenate a comfort noise parameter message with another message, such as a neighbor channel measurement results message, so as to reduce overhead, conserve bandwidth, and reduce power consumption.

SUMMARY OF THE INVENTION

The foregoing and other problems are overcome and the objects and advantages of the invention are realized by methods and apparatus in accordance with embodiments of this invention, wherein an improved method is provided for transmitting a comfort noise (CN) block, comprised of a hangover period and comfort noise parameters, during a discontinuous transmission (DTX) mode of operation.

In accordance with the teaching of this invention the comfort noise block is transmitted in such a manner that it is not interrupted by other messages, such as FACCH messages. This is accomplished in the mobile station by a determination of whether any control channel messages, such as FACCH messages, are required to be transmitted. If such control channel messages exist, the mobile station groups or otherwise organizes the control channel message or messages such that a comfort noise block can be scheduled to be transmitted without interruption.

In an embodiment of this invention, and if such FACCH messages exist, a further determination can be made as to which transmission can be made in the shortest time (i.e., the FACCH message or messages or the comfort noise block), and this transmission is made first.

In a further embodiment of this invention the comfort noise parameters are transmitted by being concatenated with another message, such as a neighbor channel measurement results message, so as to reduce overhead, conserve bandwidth, and reduce power consumption.

An element of the comfort noise parameters is a Random Excitation Spectral Control (RESC) information element, which is used in the decoder for improving the spectral content of the generated comfort noise so as to better match the background noise at the transmitter.

BRIEF DESCRIPTION OF THE DRAWINGS

The above set forth and other features of the invention are made more apparent in the ensuing Detailed Description of the Invention when read in conjunction with the attached Drawings, wherein:

FIG. 1*a* is a block diagram of conventional circuitry for generating comfort noise parameters on the transmit side.

FIG. 1*b* is a block diagram of a conventional decoder on the receive side that is used to generate comfort noise.

FIG. 1*c* illustrates the spectrum associated with the signal in different parts of the prior-art decoder of FIG. 1*b*.

FIG. 1*d* illustrates in greater detail the averaging blocks shown in FIG. 1*a*.

FIG. 2*b* is a block diagram of a decoder on the receive side that is used to generate comfort noise using the RESC parameters.

FIG. 2*c* illustrates the spectrum associated with the decoder of FIG. 2*b*.

DETAILED DESCRIPTION OF THE INVENTION

Figure 5:
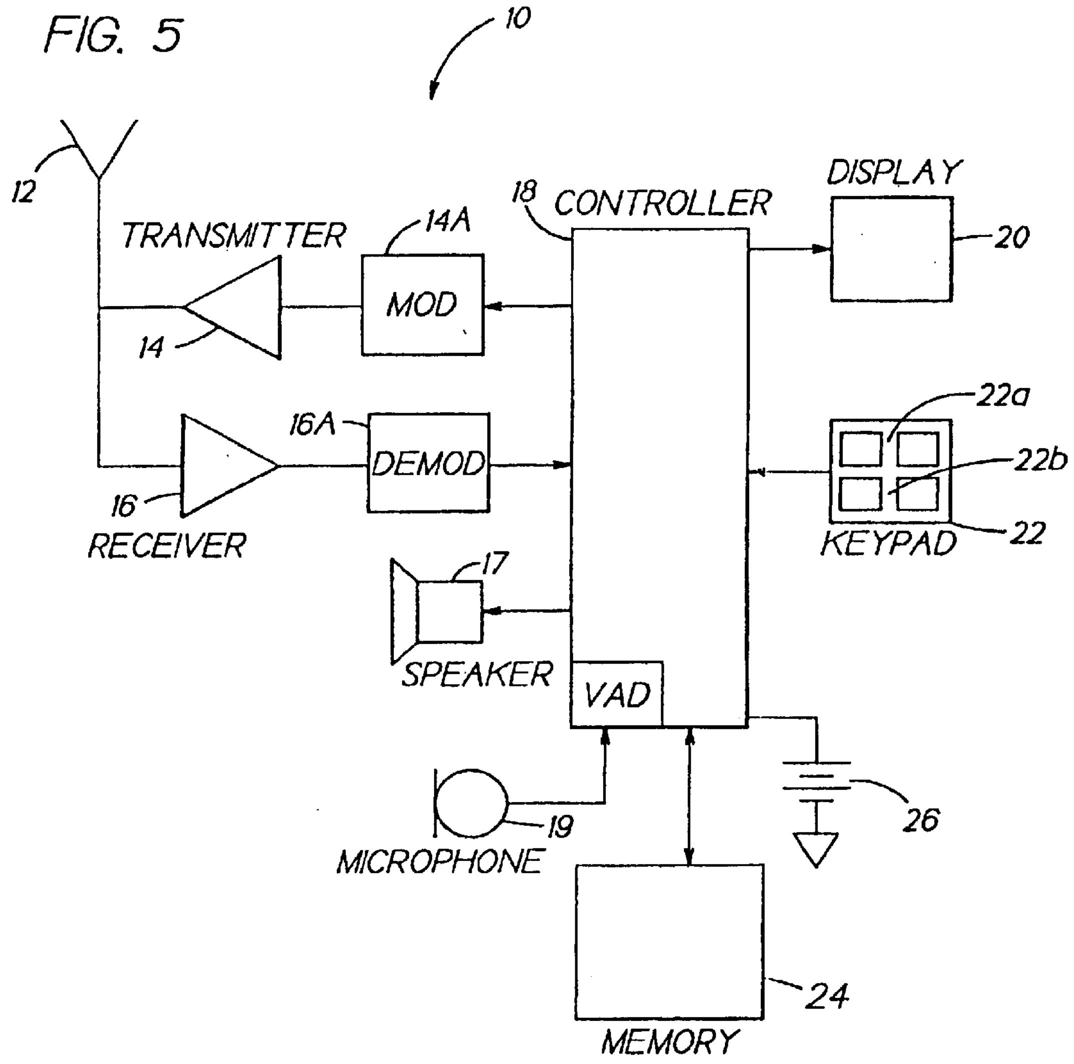
FIG. 5 is a block diagram of a mobile station that is constructed and operated in accordance with this invention.
Figure 6:
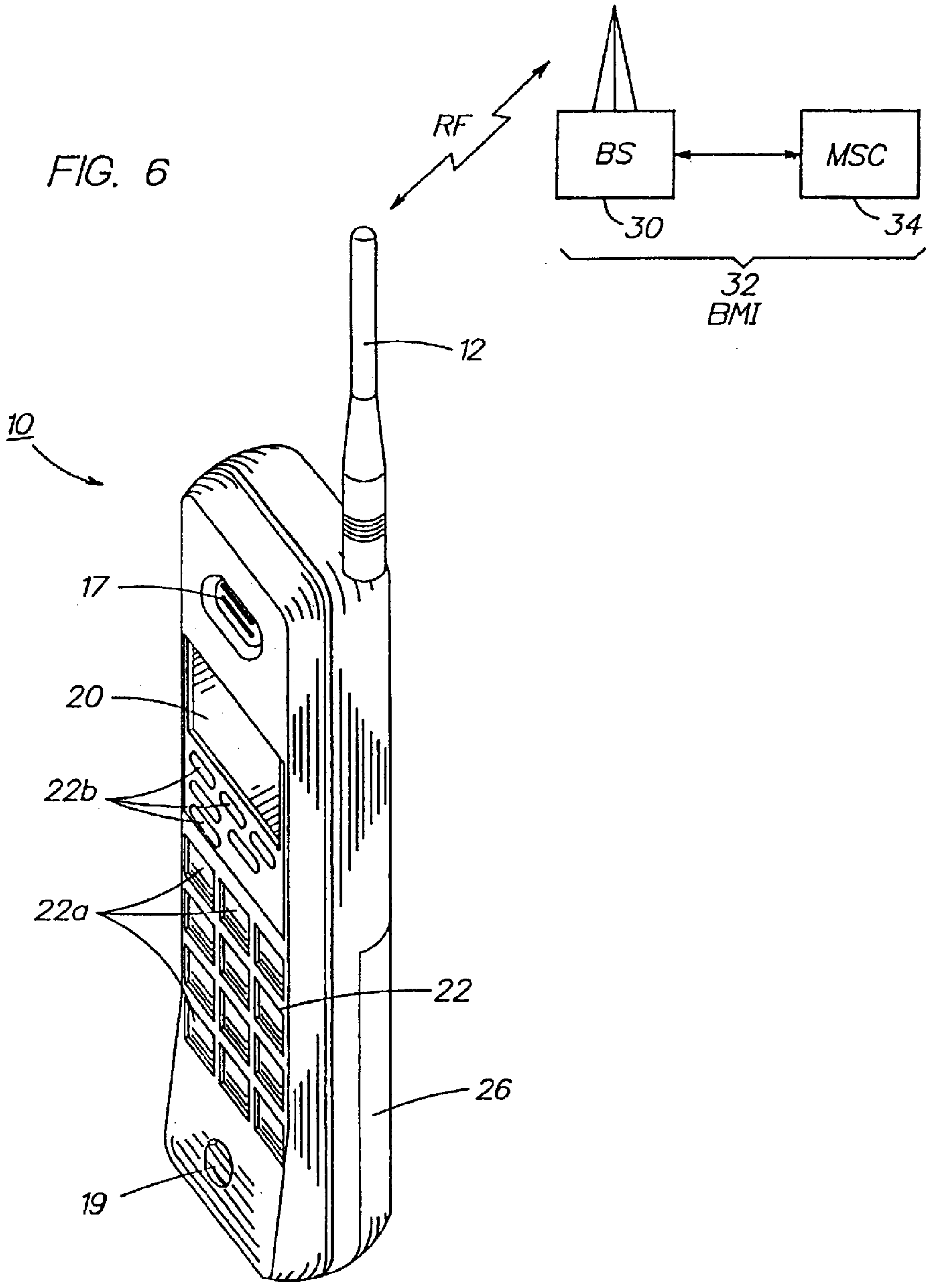
FIG. 6 is an elevational view of the mobile station shown in FIG. 5, and which further illustrates a cellular communication system to which the mobile station is bidirectionally coupled through wireless RF links.
Figure 7A:
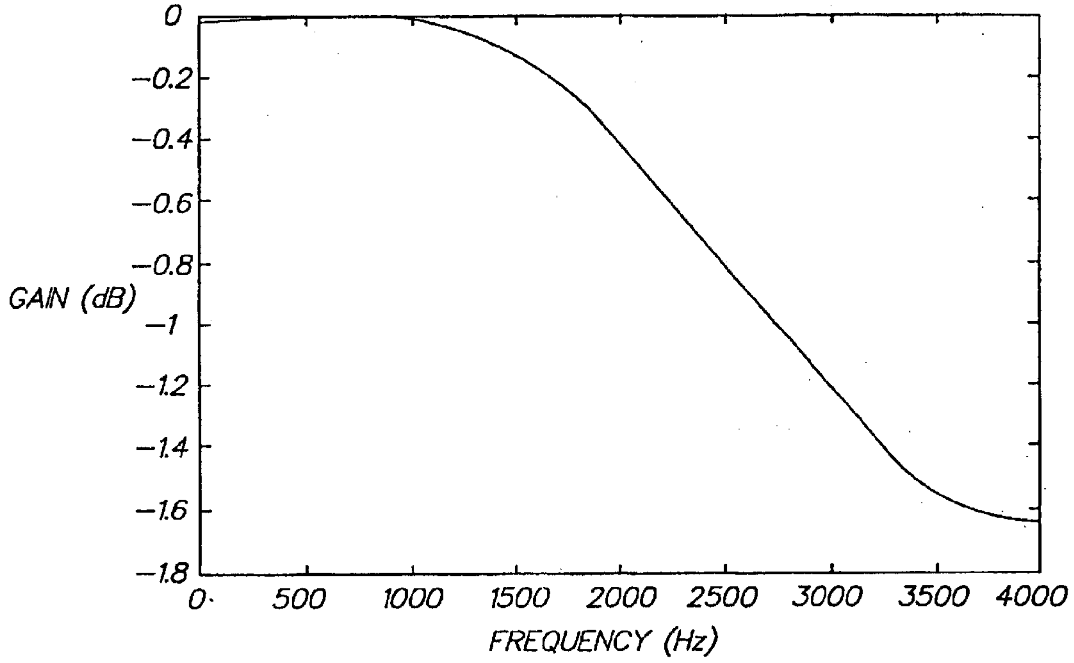
FIGS. 7*a*–7*g* illustrate exemplary frequency responses of the RESC filter.
Figure 7B:
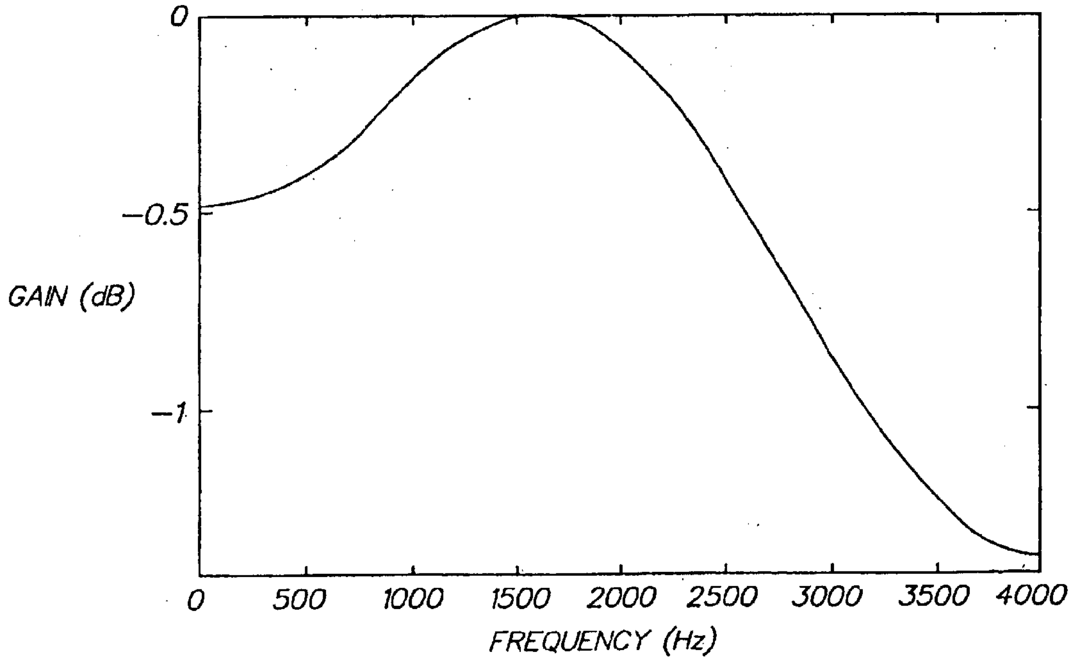
Figure 7C:
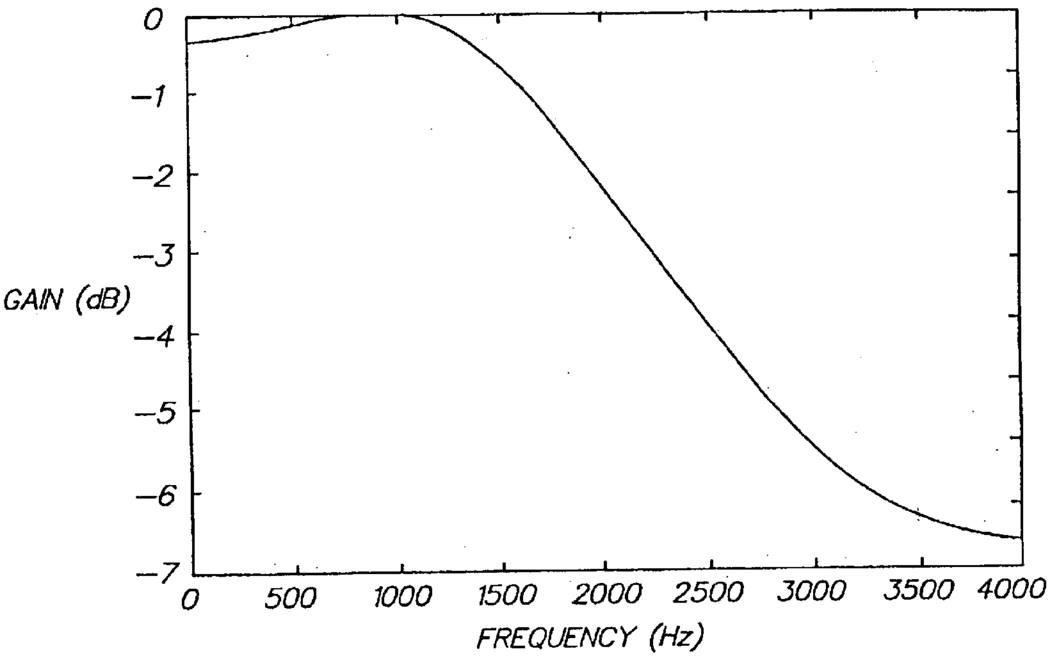
Figure 7D:
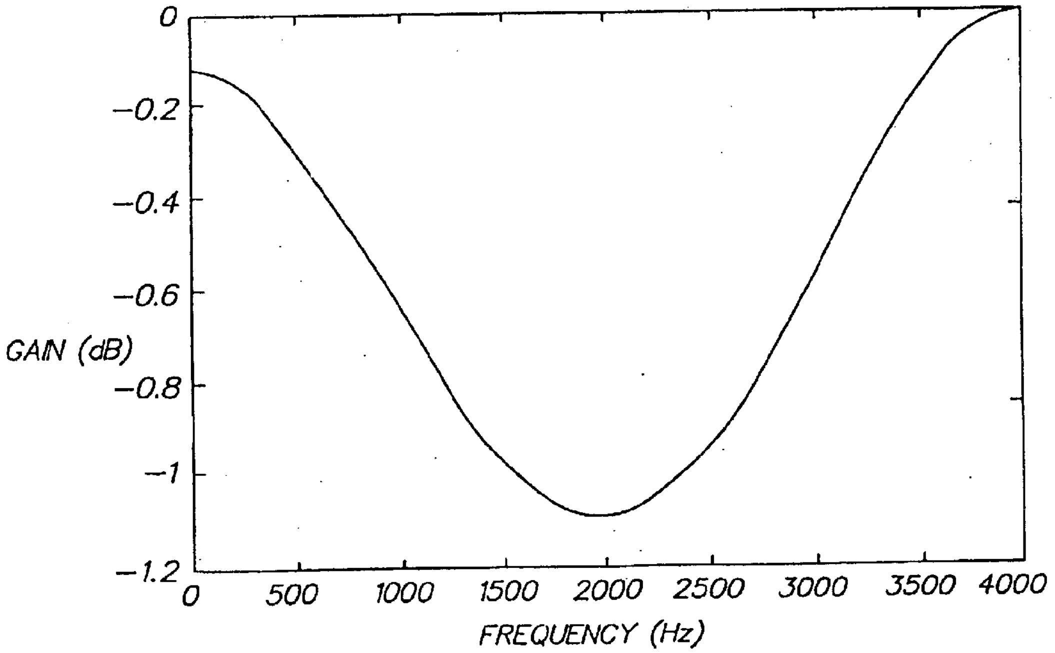
Figure 7E:
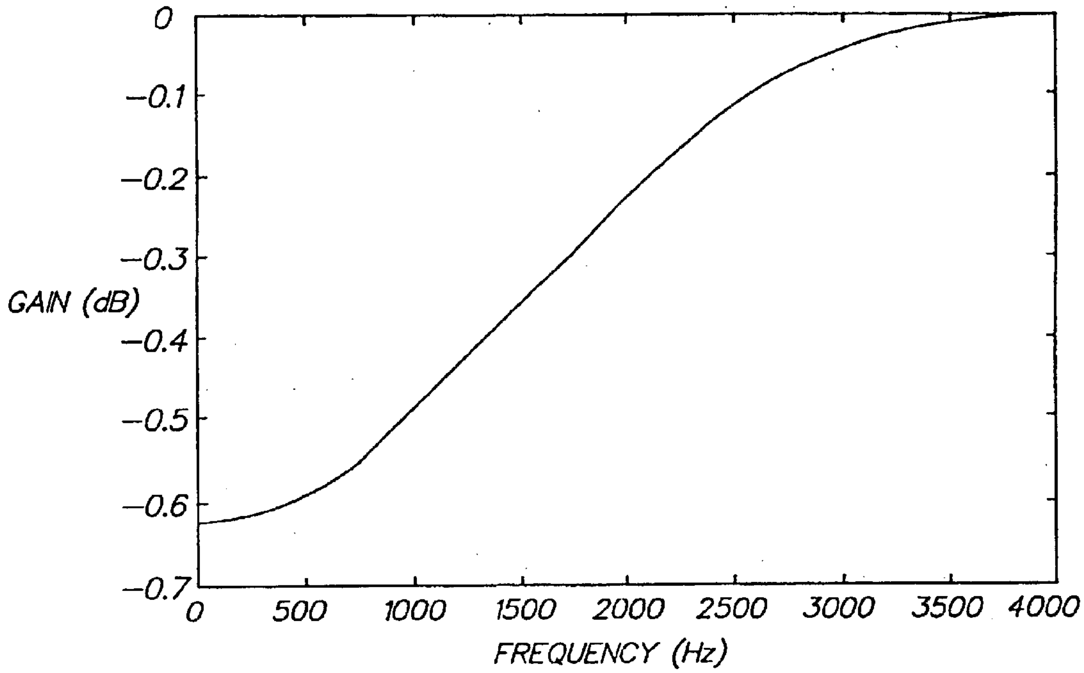
Figure 7F:
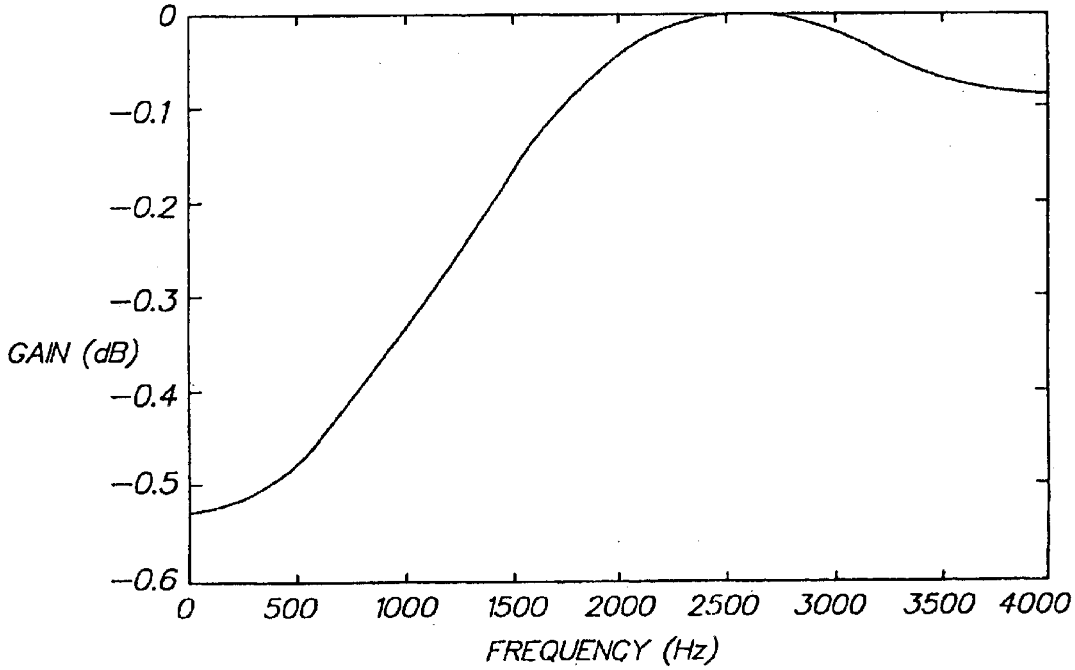
Figure 7G:
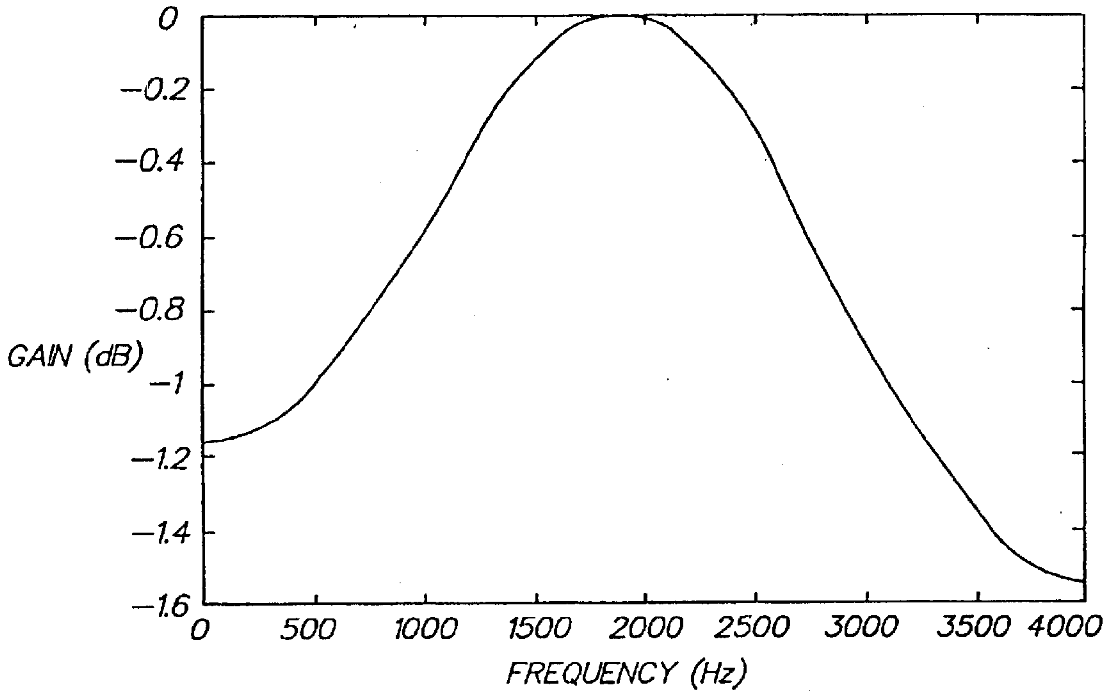

Reference is made to FIGS. 5 and 6 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network that may include a Base Station/Mobile Switching Center/Interworking function (BMI) 32 that includes a mobile switching center (MSC) 34. The MSC 34 provides a connection to landline trunks when the mobile station 10 is involved in a call. In the context of this disclosure the mobile station 10 may be referred to as the transmission side and the base station as the receive side. The base station 30 is assumed to include suitable receivers and speech decoders for receiving and processing encoded speech parameters and also DTX comfort noise parameters, as described below.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure, although the teaching of this invention is not intended to be limited to any specific structure, or for use only with an IS-136 compatible mobile station, or for use only in TDMA type systems. The air interface standard is also assumed to support a DTX mode of operation.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a speech transducer such as a conventional microphone 19 in combination with an A/D converter and a speech encoder, a display 20, and a user input device, typically a keypad 22, all of which are coupled to the controller 18. The keypad 22 includes the conventional numeric (0–9) and related keys (#,*) 22*a*, and other keys 22*b* used for operating the mobile station 10. These other keys 22*b* may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as GSM. It should thus be clear that the teaching of this invention is not to be construed to be limited to any one particular type of mobile station or air interface standard. The operating program in the memory 24 includes routines to present messages and message-related functions to the user on the display 20, typically as various menu items. The memory 24 also includes routines for implementing the methods described below with regard to the transmission of comfort noise parameters during DTX operation.

Although the invention is described next specifically in the context of an IS-136 embodiment, it is again noted that the teaching of this invention is not limited to only this one air interface standard.

With regard to DTX on a digital traffic channel (IS-136.1, Rev. A, Section 2.3.11.2), and as presently specified, when in the DTX-High state the transmitter 14 radiates at a power level indicated by the most recent power-controlling order (Initial Traffic Channel Designation message, Digital Traffic Channel (DTC) Designation message, Handoff message, Dedicated DTC Handoff message, or Physical Layer Control message) received by the mobile station 10.

In the DTX-Low state, the transmitter 14 remains off. The CDVCC is not sent except for the transmission of FACCH messages. All Slow Associated Control Channel (SACCH) messages to be transmitted by the mobile station 10, while in the DTX-Low state, are sent as a FACCH message, after which the transmitter 14 returns again to the off state unless Discontinuous Transmission (DTX) has been otherwise inhibited.

When the mobile station 10 desires to switch from the DTX-High state to the DTX-Low state, it may complete all in-progress SACCH messages in the DTX-High state, or terminate SACCH message transmission and resend the interrupted SACCH messages, in their entirety, as FACCH messages in the DTX-Low state.

When a mobile station switches from the DTX High state to the DTX Low state, it must pass through a transition state in which the transmitted power is at the DTX High level until all pending FACCH messages have been entirely transmitted.

In accordance with an aspect of this invention, the mobile station 10 remains in the transition state until a Comfort Noise Block (comprised of six DTX hangover slots, and the related Comfort Noise Parameter message) have been entirely transmitted. The Comfort Noise Block is sent without interruption. If some other FACCH message slots coincide with the sending of the Comfort Noise Block, the mobile station 10 delays the transmission of either the FACCH message or the Comfort Noise Block so as to transmit one before the other, but in any case the FACCH messages are effectively grouped or segregated such that they do not interrupt or steal the slots used for the transmission of the Comfort Noise Block. This insures the best available quality of comfort noise that is generated at a base station voice/comfort noise decoder.

In the mobile station 10, a determination is made by the controller 18 if there is a need to send hangover period slots, and if there is also a need to send any FACCH messages such as an acknowledgement type FACCH message of previously commanded channel quality measurement results (used for a mobile assisted handoff (MAHO) function). For example, the controller 18 makes a determination as to the time required to send the comfort noise block and the time required to send the one or more FACCH messages. The transmission that can be achieved in the shortest amount of time is selected first, is transmitted, and then the other transmission (comfort noise block or FACCH message(s)) is made. Other criteria could also be employed, such as one based on message priority.

In the case of a short speech/noise burst, only the Comfort Noise Parameter message is transmitted without the hangover slots. In this case there is no need to delay other coinciding FACCH messages.

With regard to Mobile Assisted Handoff (MAHO) operations with DTX (IS-136.1, Rev. A, Sections 2.4.5.3 and 3.4.6.3), and as is presently specified, the mobile station 10 transmits the signal quality information over either the SACCH or the FACCH. In the case of continuous transmission (non-DTX), the mobile station 10 transmits over the SACCH. In the case of DTX, the mobile station 10 transmits channel quality information over the SACCH whenever the mobile station 10 is in the DTX high state. If the mobile station 10 is in the DTX low state, the data is sent from the mobile station 10 to the base station 30 by going to the DTX high state and transmitting the information over the FACCH.

In accordance with a further aspect of this invention, when in the DTX low state, the CN Parameter message is appended or concatenated with the neighbor channel quality information sent over the FACCH. This technique thus avoids the use of separate FACCH messages to transmit the CN parameter message, and thus reduces overhead and conserves bandwidth and power.

Furthermore, in the presently preferred embodiment of this invention the CN parameter message is sent at, by example, one second intervals from the mobile station 10 to the base station 30, thereby further reducing overhead. The one second interval in this case is related to the IS-136 requirement that neighbor channel measurement results be reported to the base station 30 at one second intervals.

Where the neighbor channel measurement result is another message to be transmitted, it is also within the scope of the teaching of this invention to transmit the CN parameters, over the traffic channel, using DCCH channel coding and intra-slot interleaving. This can be used to enable the information to be sent in one slot. In this case the base station 30 determines if DCCH channel coding is being used, and reacts appropriately. This particular mode of operation is appropriate for when neighbor channel measurements are not in use.

In accordance with a specific embodiment of this invention, the Comfort Noise (CN) Parameter Message, shown below in Table 1, is transmitted on the reverse digital traffic channel (RDTC), specifically the FACCH logical channel, and contains 38 bits, of which 26 bits contain a LSF residual vector which is quantized using the same split vector quantization (SVQ) codebook as used in the IS-641 speech codec. The quantization/dequantization algorithms of the speech codec are modified to make it possible to use this codebook. The LSF parameters give an estimate of the spectral envelope of the background noise at the transmit side using a 10th order LPC model of the spectrum.

The next 8 bits contain a comfort noise energy quantization index, which describes the energy of the background noise at the transmit side. The remaining 4 bits in the message are used for transmitting a Random Excitation Spectral Control (RESC) information element.

TABLE 1

Message Format

| Information Element | Type | Length (bits) |
|---|---|---|
| Protocol Discriminator | M | 2 |
| Message Type | M | 8 |
| LSF residual vector | M | 26 |
| CN energy quantization index | M | 8 |
| RESC parameters | M | 4 |

Figure 2A:
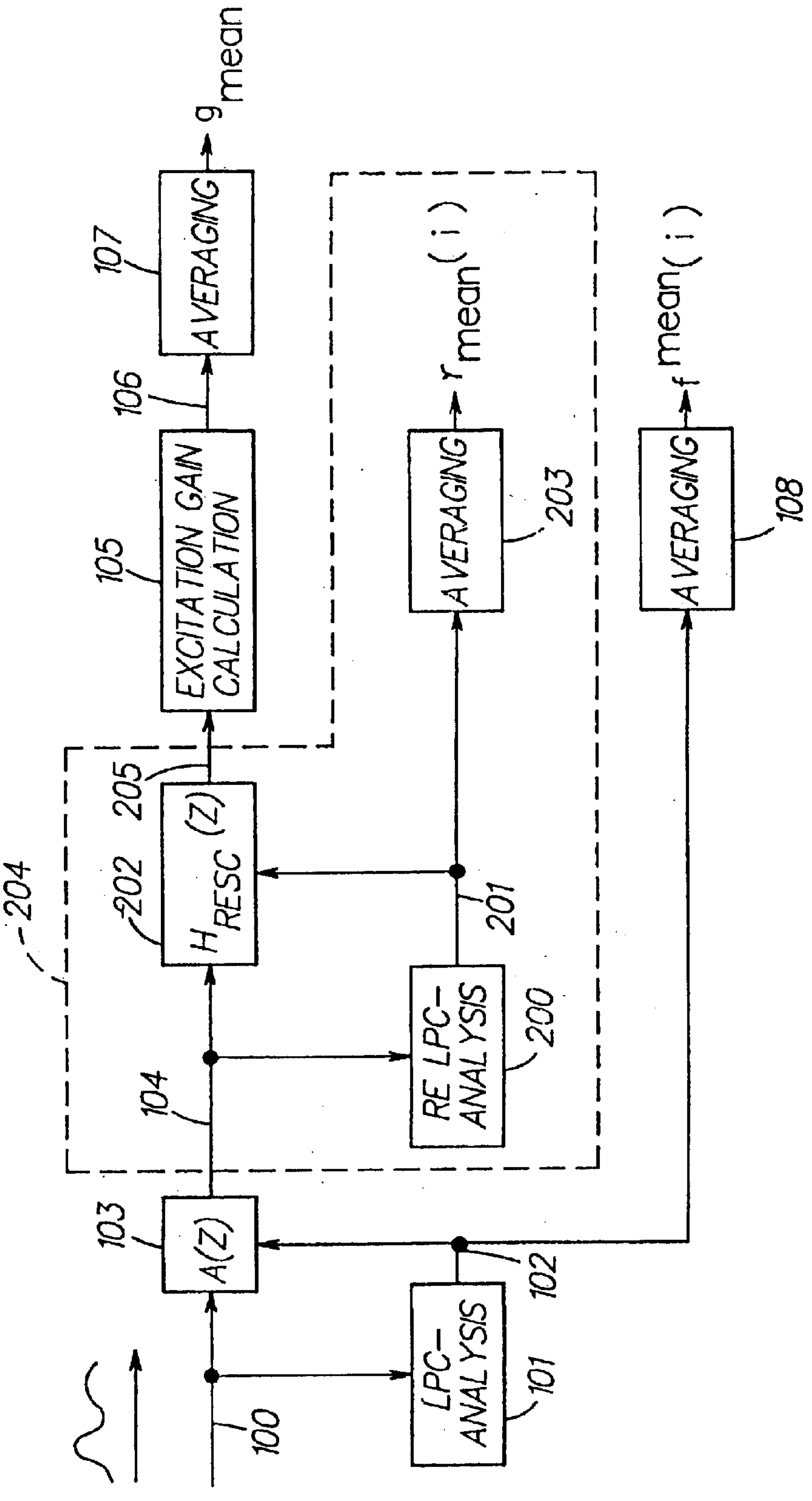
FIG. 2*a* is a block diagram of circuitry for generating comfort noise parameters on the transmit side, in particular RESC parameters.
Figure 3:
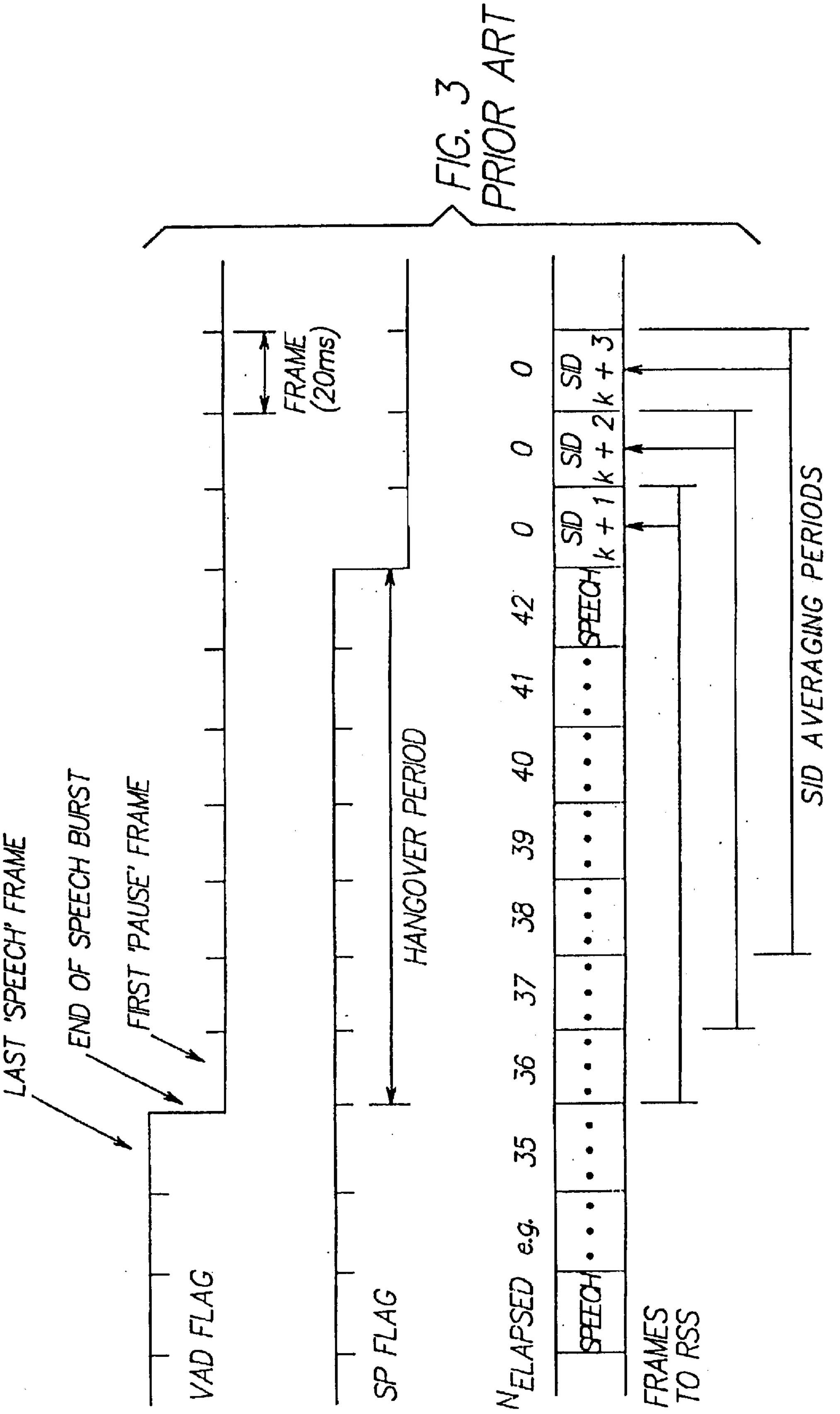
FIG. 3 PRIOR ART
FIGS. 3 and 4 are prior art timing diagrams that illustrate a hangover period in accordance with the prior art, and a smallest speech burst without generating a hangover period, respectively.
Figure 4:
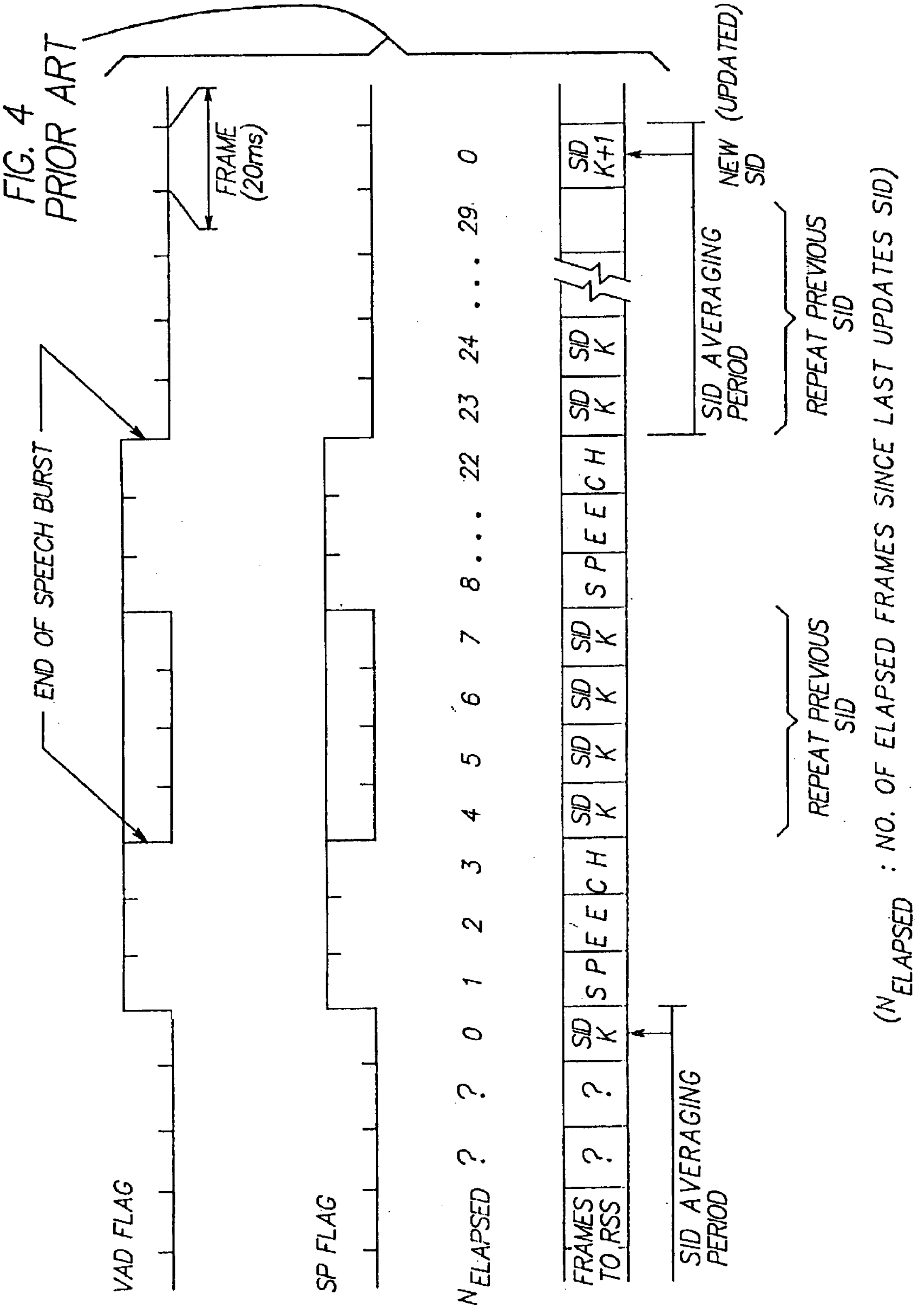
FIG. 4 PRIOR ART

The nature of the RESC information element can be better understood with reference to FIGS. 2*a*–2*c*. The conventional technique for both encoding and decoding comfort noise was described above. In FIGS. 2*a* and 2*b* those elements that appear also in FIGS. 1*a* and 1*b* are numbered accordingly.

Referring now to FIG. 2*a*, there is shown a block diagram of apparatus for generating comfort noise parameters on transmit side. The RESC-related operations are separated from those known from the prior art by a dashed line 204. According to this technique, the residual signal 104 output from the inverse filter 103 is subjected to a further analysis (such as LPC-analysis) to produce another set of filter coefficients. The second analysis, which is referred to herein as random excitation (RE) LPC-analysis 200, is typically of a lower degree than the LPC analysis carried out in block 101. The RE LPC-analysis block 200 produces random excitation spectral control parameters $r_{mean}$ (i) i=1, . . . ,R. The parameters are obtained by averaging the spectral parameters 201: from the RE LPC-analysis block 200 over several consecutive frames in averaging block 203. The RESC parameters characterize the spectrum of the excitation.

It should be noted that the RESC parameters are not a subset of the speech coding parameters, but are generated and used only during comfort noise generation. The inventors have found that first or second order LPC-analysis is sufficient to generate the RESC parameters (R=1 or 2). However, spectral models other than the all-pole model of the LPC technique may also be used. The averaging may alternatively be carried out by the RE LPC analysis block 200 by averaging the autocorrelation coefficients within the LPC parameter calculation, or by any other suitable averaging means within the LPC coefficient computation. The averaging period for the RESC parameters may be the same as that used for the other CN parameters, but is not restricted to only the same averaging period. For example, it has been found that longer averaging, than what is used for the conventional CN-parameters, can be advantageous. Thus, instead of using an averaging period of seven frames, a longer averaging period may be preferred (e.g., 10–12 frames).

Prior to calculating the excitation gain, the LPC-residual 104 is fed through a second inverse filter $H_{RESC}$(Z) 202. This filter produces a spectral controlled residual 205 which generally has a flatter spectrum than the LPC-residual 104. The random excitation spectral control (RESC) inverse filter $H_{RESC}$(Z) may be of the form of an all-zero filter (but not restricted to only this form):

$$H_{RESC}(z) = 1 - \sum_{i=1}^{R} b(i)z^{-i}. \tag{2}$$

The excitation gain is calculated from the spectrally flattened residual 205. Otherwise the operations in FIG. 2*a* are similar to those described above with regard to FIG. 1*a*.

The RESC parameters, along with the other CN parameters, are then transmitted from the mobile station 10 using the techniques described above with regard to the FACCH and the MAHO related operations when DTX is active.

Referring now to FIG. 2*b*, there is shown a block diagram of decoder on the receive side that is used to generate comfort noise according to the present invention. In the decoder, the excitation 212 is formed by first generating the white noise excitation sequence 114 with the random excitation generator 110, which is then scaled by $g_{mean}$ in scaling block 115.

The spectrally flat noise sequence 111 is then processed in a random excitation spectral control (RESC) filter 211, which produces an excitation having a correct spectral content. The RE spectral control filter 211 performs the inverse operation to the RESC inverse filter 202 employed in the encoder of FIG. 2*a*. Using the RESC inverse filter of equation (2) on the transmit side, the RE spectral control filter 211 used on the receive side is of the form $$1/H_{RESC}(z) = \frac{1}{1 - \sum_{i=1}^{R} b(i)z^{-i}}. \tag{3}$$

The RESC-parameters $r_{mean}$(i), i=1, . . . ,R that define the filter coefficients b(i), i=1, . . . , R are transmitted as part of the CN parameters to the receive side, and are used in the RE spectral control filter 211 so that the excitation for the synthesis filter 112 is suitably spectrally weighted, and is thus generally not flat spectrum. The RESC parameters $r_{mean}$(i), i=1, . . . ,R may be the same as the filter coefficients b(i), i=1, . . . ,R, or they may use some other parameter representation that enables efficient quantization for transmission, such as LSP coefficients. FIGS. 7*a*–7*g* illustrate exemplary frequency responses of the RESC filter 211.

In review, the CN-excitation generator 210 generates a spectrally flat random excitation in the RE generator 110. The spectrally flat excitation is then suitably scaled by the average gain scaler 115. To produce the correct spectrum, and to avoid a mismatch between the spectrum of the comfort noise and that of the background noise, the random excitation is fed through the RE spectrum control filter 211. The spectrally controlled excitation 212 is then used in the speech synthesis filter 112 to produce comfort noise that has an improved match to the spectrum of the actual background noise that is present at the transmit side.

The RESC parameters are not a subset of the speech coding parameters that are used during speech signal processing, but are instead calculated only during the comfort noise calculation. The RESC parameters are computed and transmitted only for the purpose of generating improved excitation for comfort noise during speech pauses. The RESC inverse filter 202 in the encoder and the RESC filter 211 in the decoder are used only for the purpose of controlling the spectrum of the random excitation.

FIG. 2*c* illustrates the spectrum of certain signals within the decoder of FIG. 2*b* during the generation of comfort noise according to the present invention. The RE generator 110 produces the random number sequences having the flat spectrum shown in curve A. This spectrum is identical to the curve A shown in 120 of FIG. 1c. Signals 114 and 111 both have this flat spectrum, it being noted that the gain scaling that occurs in block 115 does not affect the shape of the spectrum. The white noise sequence 111 is then fed through RE spectrum control filter 211 to produce the excitation 212 to the LPC synthesis filter. The improved excitation sequence 212 generally has a non-flat spectrum (curve C), and the effect of this non-flat spectrum is observed in the output spectrum (curve D) of the synthesis filter 112. The excitation sequence 212 may be lowpass or highpass type, or may exhibit a more sophisticated frequency content (depending on the degree of the RESC filter). The spectrum control is determined by the RESC parameters, which are computed on the transmit side and transmitted as part of comfort noise to the receive side, as was described above.

As was stated above, the Discontinuous Transmission (DTX) is a mechanism which allows the radio transmitter to be switched off most of the time during speech pauses for at least the purposes of saving power in the mobile station 10 and reducing the overall interference level in the air interface. DTX may be active in an IS-136 compatible mobile station 10 if allowed by the network, see IS-136.2, Section 2.6.5.2.

The problems discussed in the Background section of this patent application are addressed by generating, on the receive side, a synthetic noise similar to the transmit side background noise. The comfort noise (CN) parameters ar estimated on the transmit side and transmitted to the receive side before the radio transmission is switched off, and at a regular low rate afterwards. This allows the comfort noise to adapt to the changes of the noise on the transmit side. The DTX mechanism in accordance with this invention employs: the Voice Activity Detector (VAD) 21 (FIG. 5) on the transmit side; an evaluation of the background acoustic noise on the transmit side, in order to transmit characteristic parameters to the receive side; and a generation on the receive side of a similar noise, referred to as comfort noise, during periods where the radio transmission is switched off.

In addition to these functions, if the parameters arriving at the receive side are found to be seriously corrupted by errors, the speech or comfort noise is instead generated from substituted data in order to avoid generating annoying audio effects for the listener.

The transmit side DTX function continuously passes traffic frames, each marked by a flag SP, to the radio transmitter 14, where the SP flag="1" indicates a speech frame, and where the SP flag="O" indicates an encoded set of Comfort Noise parameters. The scheduling of the frames for transmission on the air interface is controlled by the radio transmitter 14, on the basis of the SP flag.

Figure 8:
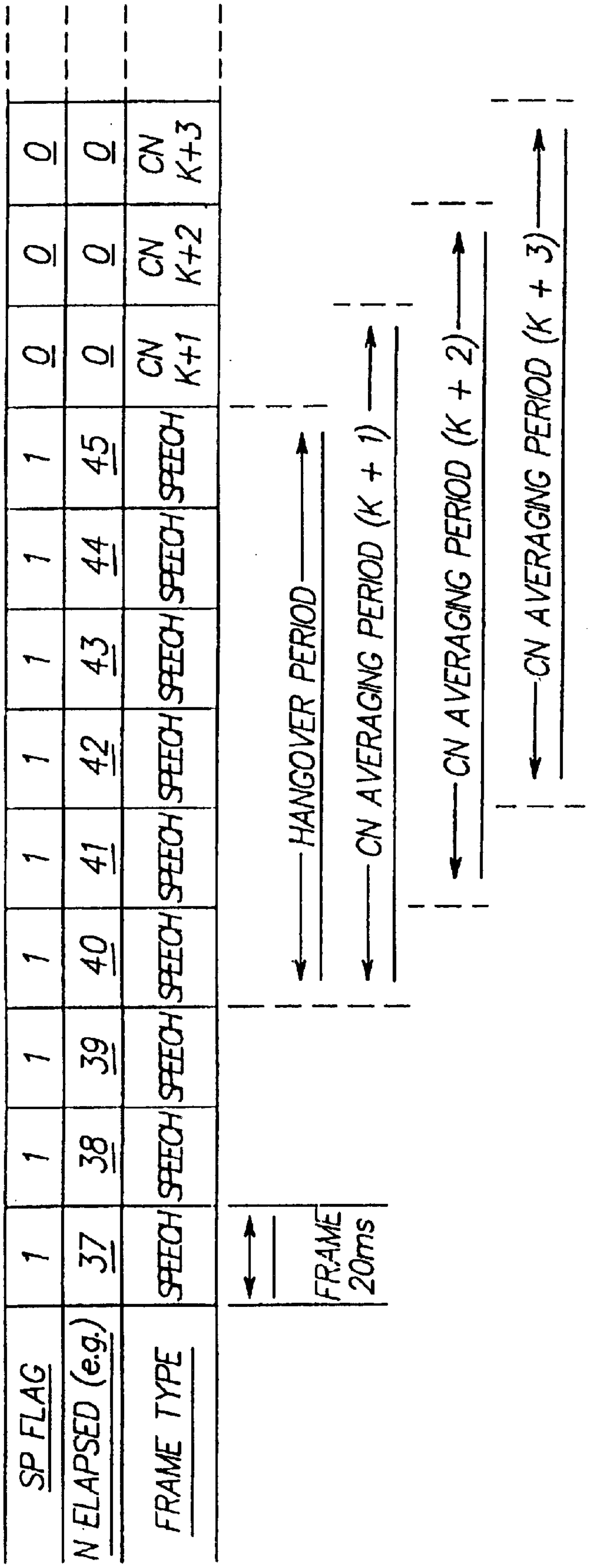
FIG. 8 is a timing diagram illustrating a normal hangover procedure, wherein $N_{elapsed}$ indicates a number of elapsed frames since a last occurrence of updated comfort noise (CN) parameters, and wherein $N_{elapsed}$ is equal to or greater than 24.

In a preferred embodiment of this invention, and to allow an exact verification of the transmit side DTX functions, all frames before the reset of the mobile station 10 are treated as if they were speech frames for an infinitely long time. Therefore, the first 6 frames after the reset are always marked with SP flag="1", even if VAD flag "0" (hangover period, see FIG. 8).

The Voice Activity Detector (VAD) 21 operates continuously in order to determine whether the input signal from the microphone 19 contains speech. The output is a binary flag (VAD flag="1" or VAD flag="0", respectively) on a frame by frame basis.

The VAD flag controls indirectly, via the transmit side DTX handler operations described below, the overall DTX operation on the transmit side.

Whenever the VAD flag="1", the speech encoded output frame is passed directly to the radio transmitter 14, marked with the SP flag="1".

At the end of a speech burst (transition VAD flag="1" to VAD flag="0"), it requires seven consecutive frames to make a new updated set of CN parameters available. Normally, the first six speech encoder output frames after the end of the speech burst are passed directly to the radio transmitter 14, marked with the SP flag="1", thereby forming the "hangover period". The first new set of CN parameters is then passed to the radio transmitter 14 as the seventh frame after the end of the speech burst, marked with the SP flag="0" (see FIG. 8).

Figure 9:
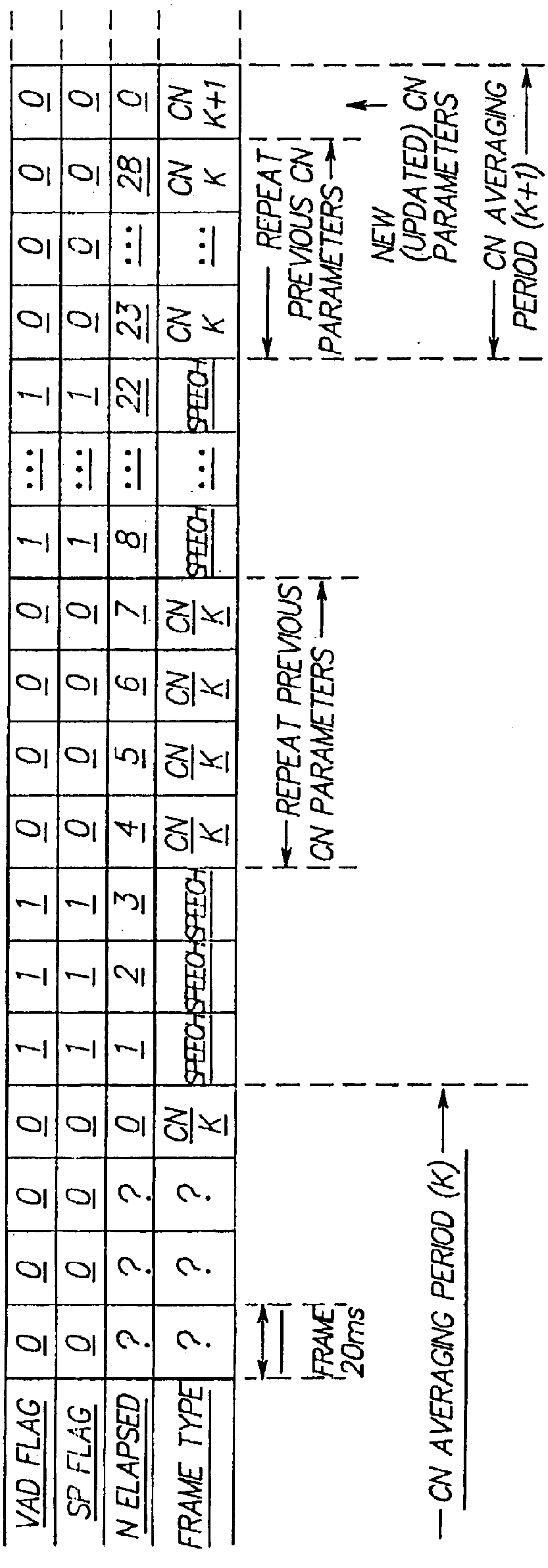
FIG. 9 is a timing diagram illustrating the handling of short speech bursts, wherein $N_{elapsed}$ is less than 24.

If, however, at the end of the speech burst, less than 24 frames have elapsed since the last set of CN parameters were computed and passed to the radio transmitter 14, then the last set of CN parameters are repeatedly passed to the radio transmitter 14, until a new updated set of CN parameters is available (seven consecutive frames marked with VAD flag="0"). This reduces the activity on the air interface in cases where short background noise spikes are interpreted as speech, by avoiding the "hangover" waiting for the CN parameter computation. FIG. 9 shows as an example the longest possible speech burst without hangover.

Once the first set of CN parameters after the end of a speech burst has been computed and passed to the radio transmitter 14, the transmit side DTX handler continuously computes and passes updated sets of CN parameters to the radio transmitter 14, marked with the SP flag="0", so long as the VAD flag="0".

The speech encoder is operated in a normal speech encoding mode if the SP flag="1" and in a simplified mode if the SP flag="0", because not all encoder functions are required for the evaluation of CN parameters.

In the radio transmitter 14 the following traffic frames are scheduled for transmission: all frames marked with the SP flag="1"; the first frame marked with the SP flag="0" after one or more frames with the SP flag="1"; those frames marked with SP="0" and aligned with the transmission instances of the channel quality information sent over the FACCH.

This has the overall effect that the radio transmission is terminated after the transmission of a FACCH CN parameter message when the speaker stops talking. During speech pauses the transmission is resumed at regular intervals for transmission of one FACCH CN parameter message, in order to update the generated comfort noise on the receive side (and to provide updated measurement results of the channel quality).

The comfort noise evaluation algorithm uses the unquantized and quantized Linear Prediction (LP) parameters of the speech encoder, using the Line Spectral Pair (LSP) representation, where the unquantized Line Spectral Frequency (LSF) vector is given by $f^t=[f_1 f_2 \ldots f_{10}]$ and the quantized LSF vector by $\hat{f}^t=[\hat{f}_1\hat{f}_2 \ldots \hat{f}_{10}]$ with t denoting transpose. The algorithm also uses the LP residual signal r(n) of each subframe for computing the random excitation gain and the Random Excitation Spectral Control (RESC) parameters.

The algorithm computes the following parameters to assist in comfort noise generation: the reference LSF parameter vector $\hat{f}^{ref}$ (average of the quantized LSF parameters of the hangover period); the averaged LSF parameter vector $f^{mean}$ (average of the LSF parameters of the seven most recent frames); the averaged random excitation gain $g_{cn}^{mean}$ (average of the random excitation gain values of the seven most recent frames); the random excitation gain $g_{cn}$; and the RESC parameters Λ.

These parameters give information on the spectrum f, $\hat{f}$, $\hat{f}^{ref}$, $f^{mean}$, Λ) and the level ($g_{cn}$, $g_{cn}^{mean}$) of the background noise.

Three of the evaluated comfort noise parameters ($f^{mean}$, Λ, and $g_{cn}^{mean}$) are encoded into a special FACCH message, referred to herein as the Comfort Noise (CN) parameter message, for transmission to the receive side. Since the reference LSF parameter vector $\hat{f}^{ref}$ can be evaluated in the same way in the encoder and decoder, as described below, no transmission of this parameter vector is necessary.

The CN parameter message also serves to initiate the comfort noise generation on the receive side, as a CN parameter message is always sent at the end of a speech burst, i.e., before the radio transmission is terminated.

The scheduling of CN parameter messages or speech frames on the radio path was described above with reference to FIGS. 8 and 9.

The background noise evaluation involves computing three different kinds of averaged parameters: the LSF parameters, the random excitation gain parameter, and the RESC parameters. The comfort noise parameter to be encoded into a Comfort Noise parameter message are calculated over the CN averaging period of N=7 consecutive frames marked with VAD="0", as described in greater detail below.

Prior to averaging the LSF parameters over the CN averaging period, a median replacement is performed on the set of LSF parameters to be averaged, to remove the parameters which are not characteristic of the background noise on the transmit side. First, the spectral distances from each of the LSF parameter vectors f(i) to the other LSF parameter vectors f(j), i=0 . . . 6, j=0 . . . 6, i≠j, within the CN averaging period are approximated according to the equation:

$$\Delta R_{ij} = \sum_{k=1}^{10} (f_i(k) - f_j(k))^2 \tag{4}$$

where $f_i(k)$ is the kth LSF parameter of the LSF parameter vector f(i) at frame i.

To find the spectral distance $\Delta S_i$ of the LSF parameter vector f(i) to the LSF parameter vectors f(j) of all other frames j=0 . . . 6, j≠i, within the CN averaging period, the sum of the spectral distances $\Delta R_{ij}$ is computed as follows:

$$\Delta S_i = \sum_{j=0,\, j\neq i}^{6} \Delta R_{ij} \tag{5}$$

for all i=0 . . . 6, i not equal to j.

The LSF parameter vector f(i) with the smallest spectral distance $\Delta S_i$ of all the LSF parameter vectors within the CN averaging period is considered as the median LSF parameter vector $f_{med}$ of the averaging period, and its spectral distance is denoted as $\Delta S_{med}$. The median LSF parameter vector is considered to contain the best representation of the short-term spectral detail of the background noise of all the LSF parameter vectors within the averaging period. If there are LSF parameter vectors f(j) within the CN averaging period with:

$$\frac{\Delta S_j}{\Delta S_{med}} \rangle TH_{med} \tag{6}$$

where $TH_{med}$=2.25 is the median replacement threshold, then at most two of these LSF parameter vectors (the LSF parameter vectors causing $TH_{med}$ to be exceeded the most) are replaced by the median LSF parameter vector prior to computing the averaged LSF parameter vector $f^{mean}$.

The set of LSF parameter vectors obtained as a result of the median replacement are denoted as f'(n−i), where n is the index of the current frame, and i is the averaging period index (i=0 . . . 6).

When the median replacement is performed at the end of the hangover period (first CN update), all of the LSF parameter vectors f(n−i) of the six previous frames (the hangover period, i=1 . . . 6) have quantized values, while the LSF parameter vector f(n) at the most recent frame n has unquantized values. In the subsequent CN update, the LSF parameter vectors of the CN averaging period in those frames overlapping with the hangover period have quantized values, while the parameter vectors of the more recent frames of the CN averaging period have unquantized values. If the period of the seven most recent frames is non-overlapping with the hangover period, the median replacement of LSF parameters is performed using only unquantized parameter values.

The averaged LSF parameter vector $f^{mean}(n)$ at frame n is computed according to the equation:

$$f^{mean}(n) = \frac{1}{7}\sum_{i=0}^{6} f'x(n-i) \tag{7}$$

where f'(n−i) is the LSF parameter vector of one of the seven most recent frames (i=0 . . . 6) after performing the median replacement, i is the averaging period index, and n is the frame index.

The averaged LSF parameter vector $f^{mean}$ (n) at frame n is preferably quantized using the same quantization tables that are also used by the speech coder for the quantization of the non-averaged LSF parameter vectors in the normal speech encoding mode, but the quantization algorithm is modified in order to support the quantization of comfort noise. The LSF prediction residual to be quantized is obtained according to the following equation:

$$r(n)=f^{mean}(n)-\hat{f}^{ref} \tag{8}$$

where $f^{mean}(n)$ is the averaged LSF parameter vector at frame n, $\hat{f}^{ref}$ is the reference LSF parameter vector, r(n) is the computed LSF prediction residual vector at frame n, and n is the frame index.

The computation of the reference LSF parameter vector $\hat{f}^{ref}$ is made on the basis of the quantized LSF parameters $\hat{f}$ by averaging these parameters over the hangover period of six frames according to the following equation:

$$\hat{f} = \frac{1}{6}\sum_{i=1}^{6} \hat{f}(n-i) \tag{9}$$

where $\hat{f}(n-i)$ is the quantized LSF parameter vector of one of the frames of the hangover period (i=1 . . . 6), i is the hangover period frame index, and n is the frame index. It should be noted that the quantized LSF parameter vectors $\hat{f}(n-i)$ used for computing $\hat{f}^{ref}$ are not subjected to median replacement prior to averaging.

For each CN generation period the computation of the reference LSF parameter vector $\hat{f}^{ref}$ is done only once at the end of the hangover period, and for the rest of the CN generation period $\hat{f}^{ref}$ is frozen. The reference LSF parameter vector $\hat{f}^{ref}$ is evaluated in the decoder in the same way as in the encoder, because during the hangover period the same LSF parameter vectors $\hat{f}$ are available at the encoder and decoder. An exception to this are the cases when transmission errors are severe enough to cause the parameters to become unusable, and a frame substitution procedure is activated. In these cases, the modified parameters obtained from the frame substitution procedure are used instead of the received parameters.

The random excitation gain is computed for each subframe, based on the energy of the LP residual signal of the subframe, according to the following equation:

$$g_{cn}(j) = 1.286\frac{\sqrt{\sum_{l=0}^{39} r(l)^2}}{10} \tag{10}$$

where $g_{cn}$, (j) is the computed random excitation gain of subframe j, r(l) is the lth sample of the LP residual of subframe j, and l is the sample index (l=0 . . . 39). The scaling factor of 1.286 is used to make the level of the comfort noise match that of the background noise coded by the speech codec. The use of this particular scaling factor value should not be read as a limitation of the practice of this invention.

The computed energy of the LP residual signal is divided by the value of 10 to yield the energy for one random excitation pulse, since during comfort noise generation the subframe excitation signal (pseudo noise) has 10 non-zero samples, whose amplitudes can take values of +1 or −1.

The computed random excitation gain values are averaged and updated in the first subframe of each frame n marked with VAD="0" according to the equation:

$$g_{cn}^{mean}(n) = \frac{1}{25}g_{cn}(n)(1) + \frac{1}{6.25}\sum_{i=1}^{6}\left(\frac{1}{4}\sum_{j=1}^{4} g_{cn}(n-i)(j)\right) \tag{11}$$

where $g_{cn}$ (n)(l) is the computed random excitation gain at the first subframe of frame n, $g_{cn}$ (n−i) (j) is the computed random excitation gain at subframe j of one of the past frames (i=1 . . . 6), and n is the frame index. Since the random excitation gain of only the first subframe of the current frame is used in the averaging, it is possible to make the updated set of CN parameters available for transmission after the first subframe of the current frame has been processed.

The averaged random excitation gain is bounded by $g_{cn}^{mean} \leqq 8064$ and quantized with an 8-bit non-uniform algorithmic quantizer in the logarithmic domain, requiring no storage of a quantization table.

With regard to the computation of RESC parameters, since the LP residual r(n) deviates somewhat from flat spectral characteristics, some loss in comfort noise quality (spectral mismatch between the background noise and the comfort noise) will result when a spectrally flat random excitation is used for synthesizing comfort noise on the receive side. To provide an improved spectral match, a further second order LP analysis is performed for the LP residual signal over the CN averaging period, and the resulting averaged LP coefficients are transmitted to the receive side in the CN parameter message to be used in the comfort noise generation. This method is referred to as the random excitation spectral control (RESC), and the obtained LP coefficients are referred to as the RESC parameters Λ.

The LP residual signals r(n) of each subframe in a frame are concatenated to compute the autocorrelations $r_{res}(k)$, k=0 . . . 2, of the LP residual signal of the 20 ms frame according to the equation:

$$r_{res}(k) = \sum_{n=k}^{159} r(n)r(n-k),\ k = 0, \ldots, 2 \tag{12}$$

After computing the autocorrelations according to the foregoing equation, the autocorrelations are normalized to obtain the normalized autocorrelations $r'_{res}(k)$.

For the most recent frame of the CN averaging period, the autocorrelations from only the first subframe are used for averaging to make it possible to prepare the updated set of CN parameters for transmission after the first subframe of the current frame has been processed.

The computed normalized autocorrelations are averaged and updated in the first subframe of each frame n marked with VAD="0" according to the equation:

$$r_{res}^{mean}(n) = \frac{1}{25}r'_{res}(n)(1) + \frac{1}{6.25}\sum_{i=1}^{6} r'_{res}(n-i) \tag{13}$$

where $r'_{res}(n)$ (l) are the normalized autocorrelations at the first subframe of frame n, $r'_{res}(n-i)$ are the normalized autocorrelations of one of the past frames (i=1 . . . 6), and n is the frame index.

The computed averaged autocorrelations $r_{ref}^{mean}$ are input to a Schur recursion algorithm to compute the two first reflection coefficients, i.e., the RESC parameters Δ, or λ(i), i=1, 2. Each of the two RESC parameters are encoded using a 2-bit scalar quantizer.

The modification of the speech encoding algorithm during DTX operation is as follows. When the SP flag is equal to "0" the speech encoding algorithm is modified in the following way. The non-averaged LP parameters which are used to derive the filter coefficients of the short-term synthesis filter H(z) of the speech encoder are not quantized, and the memory of weighing filter W(z) is not updated, but rather set to zero. The open loop pitch lag search is performed, but the closed loop pitch lag search is inactivated and the adaptive codebook gain is set to zero. If the VAD implementation does not use the delay parameter of the adaptive codebook for making the VAD decision, the open loop pitch lag search can also be switched off. No fixed codebook search is performed. In each subframe the fixed codebook excitation vector of the normal speech decoder is replaced by a random excitation vector which contains 10 non-zero pulses. The random excitation generation algorithm is defined below. The random excitation is filtered by the RESC synthesis filter, as described below, to keep the contents of the past excitation buffer as nearly equal as possible in both the encoder and the decoder, to enable a fast startup of the adaptive codebook search when the speech activity begins after the comfort noise generation period. The LP parameter quantization algorithm of the speech encoding mode is inactivated. At the end of the hangover period the reference LSF parameter vector $\hat{f}^{ref}$ is calculated as defined above. For the remainder of the comfort noise insertion period $\hat{f}^{ref}$ is frozen. The averaged LSF parameter vector $f^{mean}$ is calculated each time a new set of CN parameters is to be prepared. This parameter vector is encoded into the CN parameter message was as defined above. The excitation gain quantization algorithm of the speech encoding mode is also inactivated. The averaged random excitation gain value $g_{cn}^{mean}$ is calculated each time a new set of CN parameters is to be prepared. This gain value is encoded into the CN parameter message as previously defined. The computation of the random excitation gain is performed based on the energy of the LP residual signal, as defined above. The predictor memories of the ordinary LP parameter quantization and fixed codebook gain quantization algorithms are reset when the SP flag="0", so that the quantizers start from their initial states when the speech activity begins again. And finally, the computation of the RESC parameters is based on the spectral content of the LP residual signal, as defined above. The RESC parameters are computed each time a new set of CN parameters is to be prepared.

The comfort noise encoding algorithm produces 38 bits for each CN parameter message as shown in Table 2. These bits are referred to as vector cn[0 . . . 37]. The comfort noise bits cn[0 . . . 37] are delivered to the FACCH channel encoder in the order presented in Table 2 (i.e., no ordering according to the subjective importance of the bits is performed).

TABLE 2

Detailed bit allocation of comfort noise parameters

| Index (vector to FACCH channel encoder) | Description | Parameter |
|---|---|---|
| cn0–cn7 | Index of 1st LSF subvector | VQ index of r[1 . . . 3] |
| cn8–cn16 | Index of 2nd LSF subvector | VQ index of r[4 . . . 6] |
| cn17–cn25 | Index of 3rd LSF subvector | VQ index of r[7 . . . 10] |
| cn26–cn33 | Random excitation gain | Index of $g_{cn}^{mean}$ |
| cn34–cn35 | Index of 1st RESC parameter | Index of λ(1) |
| cn36–cn37 | Index of 2nd RESC parameter | Index of λ(2) |

Regardless of their context (speech, CN parameter message, other FACCH messages or none), the radio receiver of the base station 30 continuously passes the received traffic frames to the receive side DTX handler, individually marked by various preprocessing functions with three flags. These are the speech frame Bad Frame Indicator (BFI) flag, the comfort noise parameter Bad Frame Indicator (BFI CN) flag, and the Comfort Noise Update Flag (CNU) described below and in Table 3. These flags serve to classify the traffic frames according to their purpose. This classification, summarized in Table 3, allows the receive side DTX handler to determine in a simple way how the received frame is to be processed.

TABLE 3

Classification of traffic frames

| | BFI CN | |
|---|---|---|
| BFI | 0 | 1 |
| 0 | Unusable frame | Good speech frame |
| 1 | Valid CN parameter message | Unusable frame |

The binary BFI and BFI CN flags indicate whether the traffic frame is considered to contain meaningful information bits (BFI flag="0" and BFI CN flag="1", or BFI flag="1" and BFI CN flag="0") or not (BFI flag="1" and BFI CN flag="1", or BFI flag="0" and BFI CN flag="0"). In the context of this disclosure, a FACCH frame is considered not to contain meaningful bits unless it contains a CN parameter message, and is thus marked with BFI flag="1" and BFI CN flag="1".

The binary CNU flag marks with CNU="1" those traffic frames that are aligned with the transmission instances of the channel quality information sent over the FACCH.

The receive side DTX handler is responsible for the overall DTX operation on the receive side. The DTX operation on the receive side is as follows: whenever a good speech frame is detected, the DTX handler passes it directly on to the speech decoder; when lost speech frames or lost CN parameter messages are detected, the substitution and muting procedure is applied; valid CN parameter messages frames result in comfort noise generation until the next CN parameter message is detected (CNU="1") or good speech frames are detected. During this period, the receive side DTX handler ignores any unusable frames delivered by the radio receiver; the parameters of the first lost CN parameter message are substituted by the parameters of the last valid CN parameter message and the procedure for the CN parameter message is applied; and upon reception of a second lost CN parameter message, muting is applied.

With regard to the averaging and decoding of the LP parameters, when speech frames are received by the decoder the LP parameters of the last six speech frames are kept in memory. The decoder counts the number of frames elapsed since the last set of CN parameters was updated and passed to the radio transmitter by the encoder. Based on this count the decoder determines whether or not there is a hangover period at the end of the speech burst (if at least 30 frames have elapsed since the last CN parameter update when the first CN parameter message after a speech burst arrives, the hangover period is determined to have existed at the end of the speech burst).

As soon as a CN parameter message is received, and the hangover period is detected at the end of the speech burst, the stored LP parameters are averaged to obtain the reference LSF parameter vector $\hat{f}^{ref}$. The reference LSF parameter vector and the reference fixed codebook gain value are frozen and used for the actual comfort noise generation period.

The averaging procedure for obtaining the reference is as follows:

When a speech frame is received, the LSF parameters are decoded and stored in memory. When the first CN parameter message is received, and the hangover period is detected at the end of the speech burst, the stored LSF parameters are averaged in the same way as in the speech encoder as follows:

$$\hat{f}^{ref} = \frac{1}{6}\sum_{i=1}^{6} \hat{f}(n-i) \tag{14}$$

where $\hat{f}(n-i)$ is the quantized LSF parameter vector of one of the frames of the hangover period (i=1 . . . 6), and n is the frame index.

Once the reference LSF parameter vector has been computed, the averaged LSF parameter vector $\hat{f}^{mean}(n)$ at frame n (encoded into the CN parameter message) can be reproduced at the decoder each time a CN update message is received according to the equation:

$$\hat{f}^{mean}(n)=\hat{r}(n)+\hat{f}^{ref} \tag{15}$$

where $\hat{f}^{mean}(n)$ is the quantized averaged LSF parameter vector at frame n, $\hat{f}^{ref}$ is the reference LSF parameter vector, $\hat{r}(n)$ is the received quantized LSF prediction residual vector at frame n, and n is the frame index.

In each subframe, the fixed codebook excitation vector of the normal speech decoder containing four non-zero pulses is replaced during speech inactivity by a random excitation vector which contains 10 non-zero pulses. The pulse positions and signs of the random excitation are locally generated using uniformly distributed pseudo-random numbers. The excitation pulses take values of +1 and −1 in the random excitation vector. The random excitation generation algorithm operates in accordance with the following pseudo-code.

Pseudo-Code:

```
for (i=0; i<40; i++) code(i)=0;
for (i=0; i<10; i++){
   j=random (4);
   idx=j*10+i;
   if (random(2)==1) code(idx)=1;
   else code(idx)=−1;
}
```

where code [0 . . . 39] is the fixed codebook excitation buffer, and random (k) generates pseudo-random integer values, uniformly distributed over the range [0. . . k−1).

The received RESC parameter indices are decoded to obtain the received RESC parameters λ(i), i=1,2. After the random excitation has been generated, it is filtered by the RESC synthesis filter, defined as follows:

$$H_{RESC}^{syn}(z) = \frac{1}{1 + \sum_{i=1}^{2} \lambda(i) z^{-i}} \quad (16)$$

The RESC synthesis filter is preferably implemented using a lattice filtering method. After RESC synthesis filtering, the random excitation is subjected to scaling and LP synthesis filtering.

The comfort noise generation procedure uses the speech decoder algorithm with the following modifications. The fixed codebook gain values are replaced by the random excitation gain value received in the CN parameter message, and the fixed codebook excitation is replaced by the locally generated random excitation as was described above. The random excitation is filtered by the RESC synthesis filter, as was also described above. The adaptive codebook gain value in each subframe is set to 0. The pitch delay value in each subframe is set to, for example, 60. The LP filter parameters used are those received in the CN parameter message. The predictor memories of the ordinary LP parameter and fixed codebook gain quantization algorithms are reset when the SP flag="0", so that the quantizers start from their initial states when the speech activity begins again. With these parameters, the speech decoder now performs its standard operations and synthesizes comfort noise. Updating of the comfort noise parameters (random excitation gain, RESC parameters, and LP filter parameters) occurs each time a valid CN parameter message is received, as described above. When updating the comfort noise, the foregoing parameters are interpolated over the CN update period to obtain smooth transitions.

A lost CN parameter message is defined as an unusable frame that is received when the receive side DTX handler is generating comfort noise and a CN parameter message is expected (Comfort Noise Update flag, CNU="1").

The parameters of a single lost CN parameter message are substituted by the parameters of the last valid CN parameter message and the procedure for valid CN parameters is applied. For the second lost CN parameter message, a muting technique is used for the comfort noise that gradually decreases the output level (−3 dB/frame), resulting in eventual silencing of the output of the decoder. The muting is accomplished by decreasing the random excitation gain with a constant value of −3 dB in each frame down to a minimum value of 0. This value is maintained if additional lost CN parameter messages occur.

Although a number of presently preferred embodiments of this invention have been described with respect to specific values of frame durations, numbers of frames, and the like, it should be realized that the numbers of frames, duration of frames, duration of the hangover period, duration of the averaging period, etc., may be varied in accordance with the specifications and requirements of different types of digital mobile communications systems. Furthermore, and although the invention has been described in the context of circuit block diagrams, it will be appreciated that some of the illustrated circuit blocks are implemented by a suitably programmed digital data processor that forms a portion of the digital cellular telephone.

Thus, while the invention has been particularly shown and described with respect to preferred embodiments thereof, it will be understood by those skilled in the art that changes in form and details may be made therein without departing from the scope and spirit of the invention.

What is claimed is:

1. A method for transmitting comfort noise (CN) parameters in a digital mobile station that operates in a discontinuous transmission (DTX) mode, comprising the steps of:

generating a comfort noise parameters message in response to a voice activity detector detecting an absence of speech; and transmitting the comfort noise parameters message from the mobile station to a base station by concatenating the comfort noise parameters message with another message that is scheduled for transmission to the base station.

2. A method as in claim 1, wherein the another message scheduled for transmission is transmitted over a Fast Associated Control Channel (FACCH).

3. A method as in claim 1, wherein the another message scheduled for transmission to the base station is transmitted at one second intervals.

4. A method as set forth in claim 1, and including a step of generating a Random Excitation Spectral Control (RESC) information element as a part of the comfort noise parameters message that is concatenated with the another message, the RESC information element being used for improving a spectral content of generated comfort noise.

5. A mobile station operative with a base station, said mobile station comprising:

a transmitter;

an input speech transducer;

a voice activity detection (VAD) function coupled to said speech transducer; and a controller having an input coupled to an output of said VAD function, to an output of said speech transducer, and to an input of said transmitter, said controller being responsive to said VAD function indicating an absence of user speech for initiating a Discontinuous Transmission (DTX) mode of operation and for transmitting at least one comfort noise (CN) block, the comfort noise block being comprised of a hangover period following a detected absence of speech and comfort noise parameters, said controller being operative for transmitting the comfort noise parameters message from the mobile station to the base station by concatenating the comfort noise parameters message with another message transmitted over a control channel to the base station.

6. A method for transmitting comfort noise (CN) parameters in a digital mobile station that operates in a discontinuous transmission (DTX) mode, comprising the steps of:

generating a comfort noise parameters message in response to a voice activity detector detecting an absence of speech; and transmitting the comfort noise parameters message over a traffic channel by using Digital Control Channel (DCCH) channel coding and intraslot interleaving, thereby enabling the comfort noise parameters message to be transmitted in one time slot from the mobile station to a base station.

7. A method as set forth in claim 6, and including a step of generating a Random Excitation Spectral Control (RESC) information element as a part of the comfort noise parameters message, that is transmitted to the base station, the RESC information element being used for improving a spectral content of generated comfort noise.

* * * * *

UNITED STATES PATENT AND TRADEMARK OFFICE
CERTIFICATE OF CORRECTION

PATENT NO. : 6,816,832 B2 Page 1 of 1
DATED : November 9, 2004
INVENTOR(S) : Alanara et al.

It is certified that error appears in the above-identified patent and that said Letters Patent is hereby corrected as shown below:

Column 21,
Line 7, -- that is scheduled to be -- should be inserted before "transmitted over a control channel to the base station."

Signed and Sealed this

Eighteenth Day of January, 2005

JON W. DUDAS
*Director of the United States Patent and Trademark Office*